United States Patent
Cui et al.

(10) Patent No.: US 12,457,566 B1
(45) Date of Patent: Oct. 28, 2025

(54) METHOD FOR WIRELESS COMMUNICATION AND A NODE IN A WIRELESS NETWORK

(71) Applicant: TP-Link Systems Inc., Irvine, CA (US)

(72) Inventors: Yaoshen Cui, Shenzhen (CN); Huiting Yang, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/015,598

(22) Filed: Jan. 9, 2025

(51) Int. Cl.
  *H04L 12/00* (2006.01)
  *H04L 41/16* (2022.01)
  *H04L 41/5009* (2022.01)
  *H04W 52/36* (2009.01)

(52) U.S. Cl.
  CPC ........... *H04W 52/367* (2013.01); *H04L 41/16* (2013.01); *H04L 41/5009* (2013.01)

(58) Field of Classification Search
  CPC .. H04W 52/367; H04W 52/287; H04L 41/16; H04L 41/5009; H04K 3/226; B25J 9/163
  USPC ........................................................ 370/318
  See application file for complete search history.

(56) References Cited

U.S. PATENT DOCUMENTS

| | | | |
|---|---|---|---|
| 2018/0103385 A1* | 4/2018 | Zhu | H04W 52/287 |
| 2021/0205985 A1* | 7/2021 | Zhang | B25J 9/163 |
| 2021/0352517 A1 | 11/2021 | Wang | |
| 2022/0209885 A1* | 6/2022 | Nguyen | H04K 3/226 |

FOREIGN PATENT DOCUMENTS

| | | | |
|---|---|---|---|
| CN | 114625477 A | 6/2022 | |
| CN | 113795050 B | * 11/2022 | ............ H04W 16/14 |
| CN | 111356148 B | 3/2023 | |
| CN | 117999819 A | 5/2024 | |

OTHER PUBLICATIONS

Chinnadurai et al., System For Dynamically Optimizing Power Control And Beamforming In Wireless Communication Networks, Has Slave Deep Reinforcement Learning Module For Outputting Adjusted Power Control Parameters For Transmission, IN 202441076760 A, 2024 (Year: 2024).*

An J et al., CN 116706925 A; Method For Controlling Multi-level Node Voltage Of Distribution Network, Involves Obtaining Optimal Power Adjusting Strategy Based On Power Distribution Network Dynamic Flow Equation, Control Current And Operation Mode; 2023 (Year: 2023).*

* cited by examiner

*Primary Examiner* — Frantz Coby
(74) *Attorney, Agent, or Firm* — Loeb & Loeb LLP (57) ABSTRACT

The present disclosure provides a method, a node and a network device in the wireless network. A method for wireless communication at a node in a wireless network according to the embodiment of the present disclosure includes obtaining initial values of one or more parameters of a dynamic power control model; determining a first optimized result to the initial values of one or more parameters for minimizing a loss function, by using environment information of the node; transmitting first information indicating the first optimized result of the one or more parameters to a network device; receiving second information indicating a second optimized result of the one or more parameters for the dynamic power control model from the network device, wherein the second optimized result of the one or more parameters are determined by the network device based on the first information.

19 Claims, 6 Drawing Sheets

METHOD FOR WIRELESS COMMUNICATION AND A NODE IN A WIRELESS NETWORK

TECHNICAL FIELD

The present disclosure relates to wireless communication, and more specifically, to a method for wireless communication at a network device, a method for wireless communication at a node, and a node in a wireless network.

BACKGROUND

The network devices increase rapidly. However, the network lacks an effective mechanism for power coordination of multiple devices, which results in serious mutual interference between devices, the energy waste, and the limited communication resource utilization.

The power adjustment in the current network is relatively rigid and cannot adapt to changes in the environment. For example, the node in the network may control the transmission power based on the modulation and coding scheme (MCS). However, the node cannot consider the throughput of the overall network. Moreover, this power control method is not flexible enough.

For another example, it is proposed that a central management entity (CME) of a wireless network can be used to train the parameters related to a transmission power of each node in the wireless network with a centralized learning and training method, and the CME sends the trained parameters to the nodes which are associated with the CME. However, if the parameter training is implemented on the CME, the information indicates the local data of each node is need to be sent from the node to the CME for training the learning model. Thus, the amount of communication data is large, which affects network performance, moreover, it is difficult to guarantee the user privacy and security.

Therefore, more intelligent power adjustment is needed for dynamically balancing the network performance, interference, coverage and other requirements, and improving the efficiency of power control in the network.

SUMMARY

In view of the above, the present disclosure a method for wireless communication at a network device, a method for wireless communication at a node, and a node in a wireless network.

According to an aspect of the present disclosure, there is provided a method for wireless communication at a node in a wireless network. The method comprises obtaining initial values of one or more parameters of a dynamic power control model; determining a first optimized result to the initial values of one or more parameters for minimizing a loss function, by using environment information of the node; transmitting first information indicating the first optimized result of the one or more parameters to a network device; receiving second information indicating a second optimized result of the one or more parameters for the dynamic power control model from the network device, wherein the second optimized result of the one or more parameters are determined by the network device based on the first information.

In some embodiments, determining a first optimized result to the initial values of one or more parameters for minimizing a loss function: determining the first optimized result of the one or more parameters for the dynamic power control model by a double deep Q-learning network (DDQN) value-based reinforcement learning method.

In some embodiments, a weight vector of the DDQN value-based reinforcement learning method is related to the plurality of parameters.

In some embodiments, the weight vector of the DDQN value-based reinforcement learning method is a function of key performance indicators (KPIs) determined by the node.

In some embodiments, determining a first optimized result to the initial values of one or more parameters for minimizing a loss function comprising: determining the first optimized result of the one or more parameters for the dynamic power control model by a policy-gradient-based learning method.

In some embodiments, the policy-gradient-based learning method is an actor-critic method with an actor network and a critic network, wherein the actor network is configured to generate a strategy of determining a transmission power and a receiving sensitivity of the node, the critic network is configured to evaluate the strategy with a function of key performance indicators (KPIs) determined by the node.

In some embodiments, the one or more parameters are related to one or more of the following parameters: a transmission power, a receiving sensitivity, and a window related to the transmission power and/or the receiving sensitivity.

In some embodiments, the method further comprises: adjusting the transmission power and/or the receiving sensitivity of the node according to the second optimized result of the one or more parameters determined by the network device.

In some embodiments, the first information includes the first optimized result of each parameter in the one or more parameters, or the first information includes a difference between a first optimized result of each parameter in the one or more parameters and a corresponding parameter send by the network device.

According to an aspect of the present disclosure, determining a first optimized result to the initial values of one or more parameters for minimizing a loss function, by using environment information of the node may comprise: calculating the first optimized result to the initial values of one or more parameters for minimizing a loss function, by using the environment information of the node.

According to an aspect of the present disclosure, there is a method for wireless communication at a network device in a wireless network. The method comprises following steps: receiving first information indicating the first optimized result of the one or more parameters of a dynamic power control model from each of one or more nodes associated with a network device, wherein the first optimized result of the one or more parameters of a node associated with the network device is determined based on environment information of the node; determining a second optimized result of the one or more parameters based on the first optimized result of the one or more parameters from each of one or more nodes; and transmitting second information indicating the second optimized result of the one or more parameters for the dynamic power control model to the one or more nodes.

In some embodiments, the steps above are repeated until the number of repetition reaches a predetermined threshold or optimization of the dynamic power control model with the second optimized result of the one or more parameters satisfies a predetermined condition.

In some embodiments, the method further comprises: selecting one or more nodes from all of nodes associated with the network device.

In some embodiments, selecting one or more nodes from all of nodes associated with the network device is based on one or more of the following perimeters: type of a node; number of stations (STAs) connected to a node; a range of a transmission power window; and a range of a receiving sensitivity window.

In some embodiments, determining a second optimized result of the one or more parameters based on the first optimized result of the one or more parameters from each of one or more nodes comprises: performing weighted average to the first optimized result of the one or more parameters from the one or more nodes to obtain the second optimized result of the one or more parameters.

According to another aspect of the present disclosure, there is provided a node in a wireless network. The node may comprises: at least one memory; at least one transceiver; and at least one processor communicatively coupled to the memory and the at least one transceiver, the at least one processor configured to: obtain initial values of one or more parameters of a dynamic power control model; determine a first optimized result to the initial values of one or more parameters for minimizing a loss function, by using environment information of the node; transmit, via the at least one transceiver, first information indicating the first optimized result of the one or more parameters to a network device; and receive, via the at least one transceiver, second information indicating for second optimized result of the one or more parameters for the dynamic power control model from the network device, wherein the second optimized result of the one or more parameters are determined by the network device based on the first information.

In some embodiments, the at least one processor is configured to: determine the first optimized result of the one or more parameters for the dynamic power control model by a double deep Q-learning network (DDQN) value-based reinforcement learning method.

In some embodiments, a weight vector of the DDQN value-based reinforcement learning method is related to the one or more parameters.

In some embodiments, the weight vector of the DDQN value-based reinforcement learning method is a function of key performance indicators (KPIs) determined by the node.

In some embodiments, the at least one processor is configured to: determining the first optimized result of the one or more parameters for the dynamic power control model by a policy-gradient-based learning method.

At least based on the above embodiments of the present disclosure, an improved mechanism for the dynamic power control of the overall network may be implemented, while the user data of the node may be protected.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

The technical solution of the present disclosure will be clearly and completely described below in conjunction with accompanying drawings. The described embodiments are part of embodiments of the present disclosure, but not all of them. Based on the embodiments in the present disclosure, all other embodiments acquired by ordinary skilled in the art without making any creative efforts fall within the scope of protection of the present disclosure.

Some of the drawings may not depict all the components of a given method, device and system. Like reference numerals may be used to denote like features throughout the specification and drawings.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occurs therebetween.

According to one aspect of the present disclosure, a network device in the wireless network may be associated with one or more node, and a node may be an access point (AP), a relay device, or a station (STA). In the present disclosure, an AP, which may be interchangeably referred to as a wireless access point (WAP), is a communication device that may communicate with a non-AP (e.g., a station (STA) or client device) in a WLAN and that allows the non-AP to connect to a wired network. The AP usually connects to a router (via a wired network) as a standalone device, but it may also be integrated with or employed in the router.

Likewise, in the present disclosure, a STA is a communication device that may communicate with an AP to obtain various communication services such as voice, video, packet data, messaging, broadcast, etc. The STA may be any device that contains an IEEE 802.11-conformant media access control (MAC) and physical layer (PHY) interface to the wireless medium (WM). For example, a STA may be a laptop, a desktop personal computer (PC), a personal digital assistant (PDA), an access point or a Wi-Fi phone in a WLAN environment. The STA may be fixed or mobile. In the WLAN environment, the terms "STA", "client device", "wireless client", "user" and "user device" are often used interchangeably.

In the present disclosure, a STA in a WLAN may work as an AP at a different occasion, and vice versa. This is because communication devices in the context of IEEE 802.11 (Wi-Fi) technologies may include both STA hardware components and AP hardware components. In this manner, the communication devices may switch between a STA mode and an AP mode, based on actual WLAN condition and/or requirements. In various embodiments below, a non-AP STA may refer to a STA in a WLAN that is not implemented as an AP.

As previously mentioned, according to the conventional power control method, the parameter training is implemented on the CME, and the information indicates the local data of each node is need to be sent from the node to the CME for training the learning model. Thus, the amount of communication data is large, which affects network performance, moreover, it is difficult to guarantee the user privacy and security.

In view of at least the above problem, the overall concept of the present disclosure is to leverage the characteristic of the distributed architecture. In the embodiments of the present disclosure, each of the one or more associated nodes associated with the sever of the network may store a dynamic power control model of the network. Specifically, the dynamic power control models in the associated nodes are the same. Each of the one or more associated nodes may obtain initial values of one or more parameters of a dynamic power control model and determine the first optimized result to the initial values of one or more parameters for minimizing a loss function, by using the environment information of the node. The network device of the network collects the information indicated the first optimized results of parameters for the dynamic power control model from each of the one or more associated nodes. That is, each of the one or more nodes transmits the first optimized result of one or more parameters, instead of the environment information of the node, to the network device. In another word, the environment information, which is related to the user data of the node, is not transmitted to the network device.

According to the embodiments of the present disclosure, the network device may be the server or the node in the network, and the network device may include a processing module to processing the environment information transmitted by the one or more associated nodes. Specifically, the network device optimizes the one or more parameters based on the first optimized results from each of one or more associated nodes. For example, the network device may optimize a certain parameter by performing averaging or gradient averaging to the first optimized results from each of one or more associated nodes for the parameter. Thus, the dynamic power control of the overall network may be implemented, while the user (which is also called as subscriber in the present disclosure) data of the node may be protected.

Figure 1:
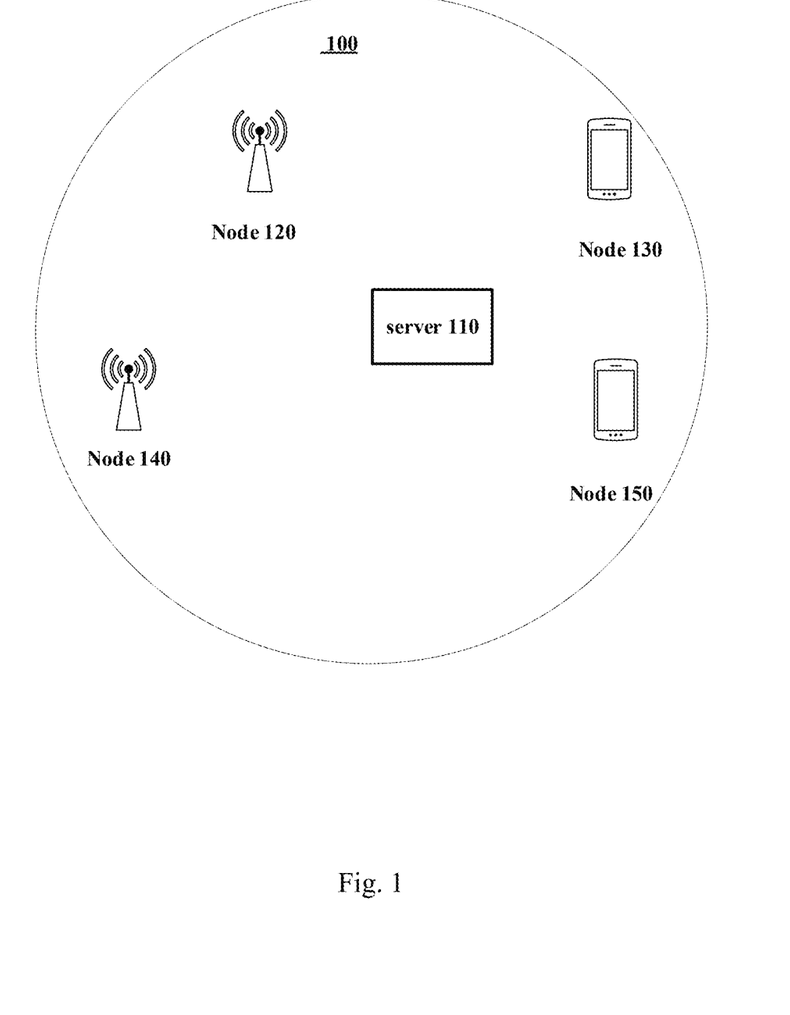
FIG. 1 is a diagram illustrating an example of a network device and nodes connected with the network device in a wireless network, in accordance with the present disclosure.

FIG. 1 is a diagram illustrating an example of a network device and nodes connected with the network device in a wireless network, in accordance with the present disclosure. As shown in FIG. 1, in the wireless network 100, the network device is server 110. It should be understood that in alternative embodiments, the network device may also be other devices in the network, such as the node which includes a processing module to processing the environment information transmitted by the one or more associated nodes. In the wireless network 100, the server 110 is connected with the node 120, node 130, node 140, and node 150. The node 120 and node 140 are the APs, the node 130 is a relay device, and the node 150 is an STA. Each of the node 120, node 130, node 140, and node 150 may store the environment information of the subscribers of the node for a predetermined period of time. The environment information may indicate the communication environment of the subscribers. For example, the environment information may indicate the received RSSI of other STAs, the situation of transmission and existence of other STAs, the channel occupancy, and/or the SNR at receiving end, etc. The environment information may be used to determine whether the wireless environment has changed. For example, some STAs may disappear, or the channel occupancy rate may become very busy, etc.

In the embodiment of FIG. 1, a dynamic power control model, which may be a machine learning model, is used for the wireless network 100. The dynamic power control model is deployed on the nodes of the wireless network 100. Specifically, the dynamic power control model may be trained at one or more nodes among the nodes connected with the server 110 respectively, with the environment information stored the on the corresponding node. The server 110 may select the node for training the parameters of the dynamic power control model based on the type of the node, the number of the STAs connected to the node, a range of a transmission power window, and/or a range of a receiving sensitivity window of the node. For example, the server 110 may select the node which is an AP for training the parameters of the dynamic power control model. In this case, the node 120 and node 140 will be selected for determining the first optimized result of the one or more parameters of the dynamic power control model for minimizing a loss function, by using the environment information of the node 120 and node 140, respectively.

Figure 2:
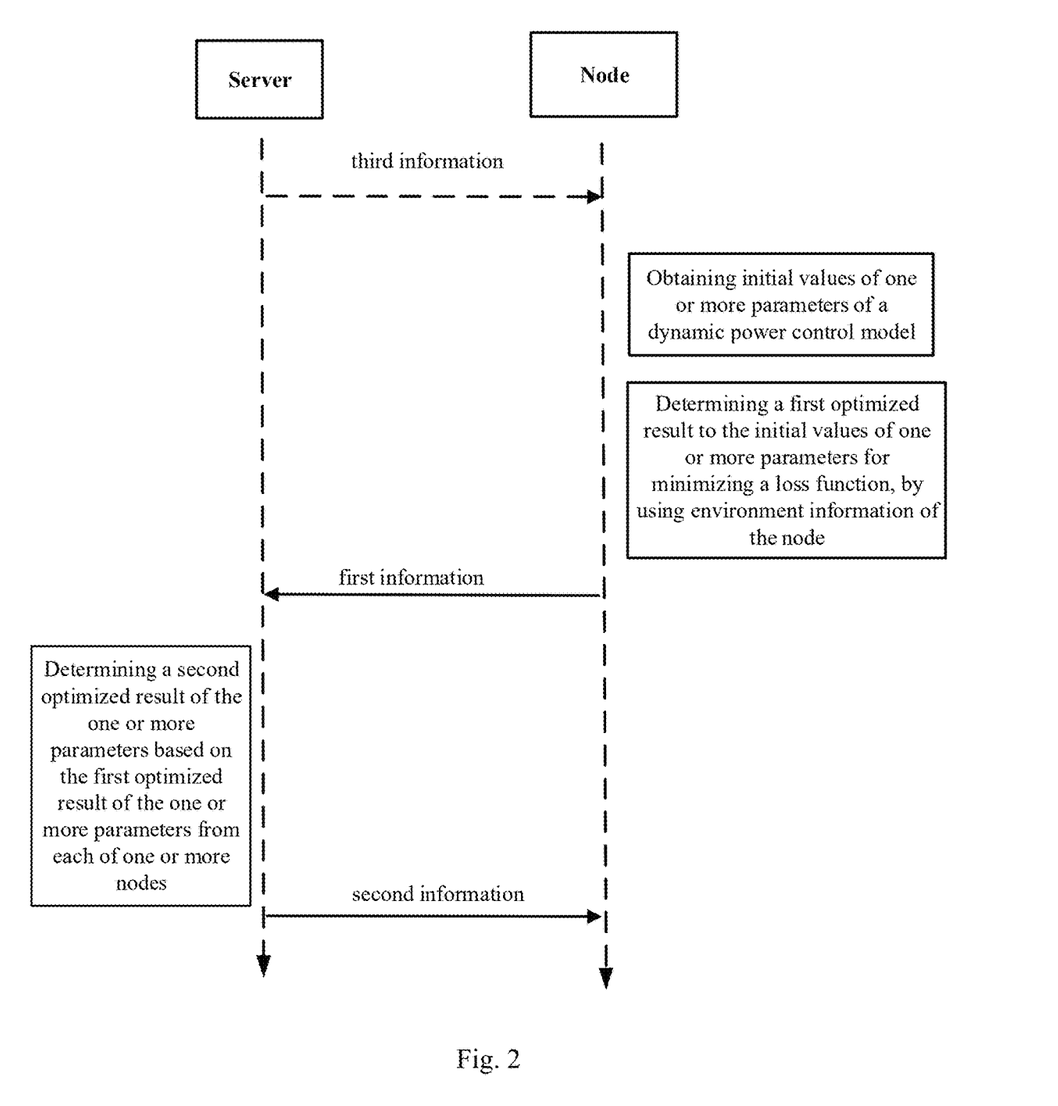
FIG. 2 is a diagram illustrating an example of the procedure for determining the parameters of the dynamic power control model, in accordance with the present disclosure.

FIG. 2 is a diagram illustrating an example of the procedure for determining the parameters of the dynamic power control model, in accordance with the present disclosure. In the following, the procedure for determining the parameters of the dynamic power control model shown in FIG. 2 will be described by taking the server and nodes shown in FIG. 1 as an example.

As mentioned above, the sever 110 may select one or more nodes from the associated nodes to training the parameters for a dynamic power control model. For example, the server 110 may select the node 120 and node 140 which are APs for determining the first optimized result of the one or more parameters of the dynamic power control model for minimizing a loss function. For another example, the one or more parameters are related to one or more of the following parameters: a transmission power, a receiving sensitivity, and a window related to the transmission power and/or the receiving sensitivity of a node.

According to one embodiment of the present disclosure, two windows maybe related to the transmission power of a node. For example, the first transmission (Tx) window is a fixed window with a power range of [T1, T2]. The power range of the first transmission (Tx) window maybe determined based on the local certification regulations, regulations, and/or the capability of the node. For example, the power range of the first Tx window may be determined based on the radar band of the node. On the other hand, the second Tx window maybe a dynamic window with a power range of [T3, T4], which may be adjusted based on the environment information of the node in real time. The power range of the second Tx window is included in the power range of the first Tx window, where $$T1 <= T3 <= T4 <= T2.$$

Similar to the Tx windows, according to one embodiment of the present disclosure, two windows maybe related to the reception power of a node. For example, the receiving sensitivity of the node is set with two reception (Rx) windows similar to the Tx windows. The first receiving sensitivity window maybe a fixed window with a power range of [R1, R2]. The power range of the first reception (Rx) window maybe determined based on local certification regulations, regulations, and/or the capability of a node. On the other hand, the second receiving sensitivity window is a dynamic window with a power range of [R3, R4], which may be adjusted based on the environment information of the node in real time, where $$R1 <= R3 <= R4 <= R2.$$

Each of the node 120 and node 140 may determine a first optimized result of one or more parameters of a dynamic power control model for minimizing a loss function, by using environment information of the node. For example, each of the node 120 and node 140 may obtain the initial values for the one or more parameters of the dynamic power control model, and calculate the first optimized result of the one or more parameters for minimizing a loss function, by using the environment information of the node.

The initial values for the one or more parameters of the dynamic power control model may be predetermined and stored in the node. Alternatively, the sever may transmit the third information indicating the initial values for the one or more parameters for a dynamic power control model to one or more nodes associated with the network device. As shown in the FIG. 2, the sever 110 may transmit the third information indicating the initial values of one or more parameters for a dynamic power control model to the node 120 and node 140.

According to one embodiment of the present disclosure, each of the node 120 and node 140 may determine the first optimized result of the one or more parameters for the dynamic power control model by a double deep Q-learning network (DDQN) value-based reinforcement learning method. For example, the weight vector of the DDQN value-based reinforcement learning method is a function of key performance indicators (KPIs) determined by the node. For another example, each node may select a KPI calculation function according to its own traffic requirements (such as downloading, gaming, etc.). The KPIs maybe related to at least one of latency, throughput, power consumption, CQI, SNR/SINR, interference intensity of the node. Moreover, the KPIs may at least include a transmission power and a receiving sensitivity of the node. The KPI calculation functions for different nodes may be different. For example, the different types of nodes may use different KPI calculation functions. Thus, the node may calculate the first optimized result to the initial values for the one or more parameters of the dynamic power control model, by using its own environment information via the DDQN value-based reinforcement learning method with the KPI calculation function of the node.

According to another embodiment of the present disclosure, each of the node 120 and node 140 may determine the first optimized result of the one or more parameters for the dynamic power control model by a policy-gradient-based learning method. For example, the policy-gradient-based learning method maybe an actor-critic method with an actor network and a critic network. The actor network maybe configured to generate a strategy of determining a transmission power and a receiving sensitivity of the node, and the critic network may be configured to evaluate the strategy with a function of key performance indicators (KPIs) determined by the node. As mentioned above, the KPIs maybe related to at least one of latency, throughput, power consumption, CQI, SNR/SINR, interference intensity of the node. Moreover, the KPIs may at least include a transmission power and a receiving sensitivity of the node. The KPI calculation functions for different nodes may be different. Thus, the node may calculate the first optimized result to the initial values for the one or more parameters of the dynamic power control model, by using its own environment information via the policy-gradient-based learning method with the KPI calculation function of the node.

Moreover, each of the node 120 and node 140 transmits first information indicating a first optimized result of the one or more parameters to the server. For example, the first information may include the first optimized result of each parameter in the one or more parameters. For another example, the first information may include a difference between a first optimized result of each parameter in the one or more parameters and a corresponding parameter send by the server.

The server 110 receives the first information indicating the first optimized result of the one or more parameters from each of the node 120 and node 140. Then, the server 110 may further optimize the one or more parameters based on the first optimized result of the one or more parameters from each of the node 120 and node 140. For example, the server 110 may determine a second optimized result of the one or more parameters by performing weighted average to the first optimized results of the one or more parameters from the node 120 and node 140. For example, the server 110 may perform the algorithm of FederatedAveraging (FedAvg) to the first optimized results of the node 120 and node 140 for each parameter, to determine a second optimized result of the one or more parameters. Moreover, the server 110 may transmit the second optimized result of the one or more parameters for the dynamic power control model to the node 120 and node 140.

The server 110, the node 120 and node 140 may repeat the procedure described in conjunction with FIG. 2, until the dynamic power control model for the wireless network 100 is completed convergence. For example, the number of repetition reaches a predetermined threshold or optimization of the dynamic power control model with the second optimized result of the one or more parameters satisfies a predetermined condition. Moreover, when the dynamic power control model for the wireless network 100 is completed convergence, each of the nodes associated with the server 110 may adjust the transmission power and/or the receiving sensitivity of the node according to the second optimized result of the one or more parameters determined by the server.

Figure 3:
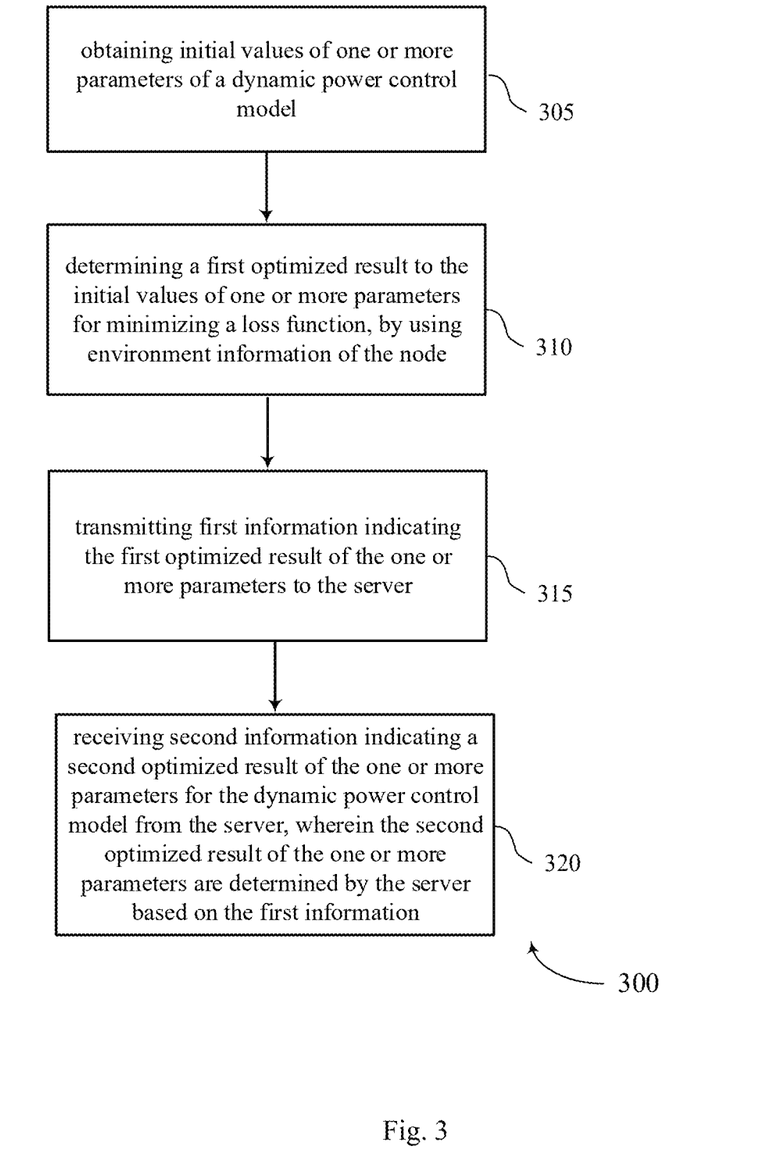
FIG. 3 shows a flowchart illustrating a method for wireless communication at a node in a wireless network in accordance with one or more aspects of the present disclosure.

FIG. 3 shows a flowchart illustrating a method 300 for wireless communication at a node in a wireless network in accordance with one or more aspects of the present disclosure. The operations of method 300 may be implemented by a node in a wireless network or its components as described herein. For example, the operations of method 300 may be performed by the node 120 and the node 140 respectively, as described with reference to FIGS. 1 through 2. In some examples, a node may execute a set of instructions to control the functional elements of the node to perform the functions described herein. Additionally or alternatively, a node may perform aspects of the functions described herein using special-purpose hardware.

At 305, the node may obtain initial values of one or more parameters of a dynamic power control model. For example, the initial values for the one or more parameters of the dynamic power control model may be predetermined and stored in the node. At 305, the node may obtain the predetermined initial values of one or more parameters of a dynamic power control model. For another example, the sever may transmit the third information indicating the initial values for the one or more parameters for a dynamic power control model to one or more nodes associated with the network device. At 305, the node may receive the third information and obtain initial values of one or more parameters of a dynamic power control model from the network device associated with the node.

At 310, the node may determine a first optimized result to the initial values of one or more parameters for minimizing a loss function by using environment information of the node.

In one embodiment of the present disclosure, at 310, the node may determine a first optimized result to the initial values of one or more parameters for minimizing a loss function by a double deep Q-learning network (DDQN) value-based reinforcement learning method. For example, the weight vector of the DDQN value-based reinforcement learning method is a function of key performance indicators (KPIs) determined by the node. For another example, each node may select a KPI calculation function according to its own traffic requirements (such as downloading, gaming, etc.). The KPIs maybe related to at least one of latency, throughput, power consumption, CQI, SNR/SINR, interference intensity of the node. Moreover, the KPIs may at least include a transmission power and a receiving sensitivity of the node. The KPI calculation functions for different nodes may be different. For example, the different types of nodes may use different KPI calculation functions. Thus, the node may calculate the first optimized result to the initial values for the one or more parameters of the dynamic power control model, by using its own environment information via the DDQN value-based reinforcement learning method with the KPI calculation function of the node.

According to another embodiment of the present disclosure, at 310, the node may determine the first optimized result of the one or more parameters for the dynamic power control model by a policy-gradient-based learning method. For example, the policy-gradient-based learning method maybe an actor-critic method with an actor network and a critic network. The actor network maybe configured to generate a strategy of determining a transmission power and a receiving sensitivity of the node, and the critic network may be configured to evaluate the strategy with a function of key performance indicators (KPIs) determined by the node. As mentioned above, the KPIs maybe related to at least one of latency, throughput, power consumption, CQI, SNR/SINR, interference intensity of the node. Moreover, the KPIs may at least include a transmission power and a receiving sensitivity of the node. The KPI calculation functions for different nodes may be different. Thus, the node may calculate the first optimized result to the initial values for the one or more parameters of the dynamic power control model, by using its own environment information via the policy-gradient-based learning method with the KPI calculation function of the node.

At 315, the node may transmit first information indicating a first optimized result of the one or more parameters to the network device. For example, the first information may include a first optimized result of each parameter in the one or more parameters. For another example, the first information may include a difference between a first optimized result of each parameter in the one or more parameters and a corresponding parameter send by the network device.

For example, the one or more parameters are related to one or more of the following parameters: a transmission power, a receiving sensitivity, and a window related to the transmission power and/or the receiving sensitivity.

At 320, the node may receive second information indicating a second optimized result of the one or more parameters for the dynamic power control model from the network device, wherein the second optimized result of the one or more parameters are determined by the network device based on the first information. Moreover, the method 300 further comprises the step of adjusting the transmission power and/or the receiving sensitivity of the node according to the second optimized result of the one or more parameters determined by the network device.

According to one embodiment of the present disclosure, the node may repeat the procedure described in conjunction with FIG. 3, until the dynamic power control model for the wireless network is completed convergence. For example, the number of repetition reaches a predetermined threshold or optimization of the dynamic power control model with the second optimized result of the one or more parameters satisfies a predetermined condition. Moreover, when the dynamic power control model for the wireless network is completed convergence, the method 300 may further include the step of adjusting the transmission power and/or the receiving sensitivity of the node according to the second optimized result of the one or more parameters determined by the network device.

Figure 4:
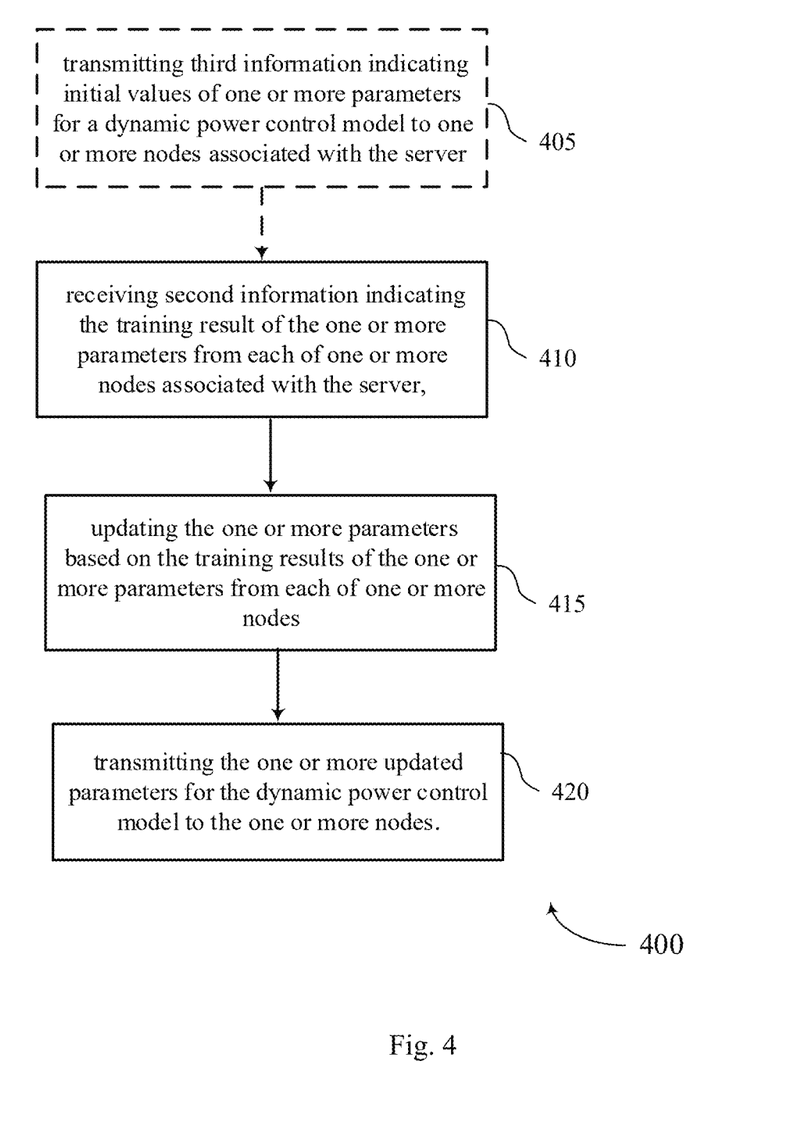
FIG. 4 shows a flowchart illustrating a method for wireless communication at a network device in a wireless network in accordance with one or more aspects of the present disclosure.

FIG. 4 shows a flowchart illustrating a method 400 for wireless communication at a network device in a wireless network in accordance with one or more aspects of the present disclosure. The operations of method 400 may be implemented by a network device or its components as described herein. For example, the operations of method 400 may be performed by the server 110 as described with reference to FIGS. 1 through 2. In some examples, a network device may execute a set of instructions to control the functional elements of the network device to perform the functions described herein. Additionally or alternatively, a network device may perform aspects of the functions described herein using special-purpose hardware.

At 405, the network device may transmit third information indicating initial values of one or more parameters for a dynamic power control model to one or more nodes associated with the network device. For example, the one or more parameters are related to one or more of the following parameters: a transmission power, a receiving sensitivity, and a window related to the transmission power and/or the receiving sensitivity.

For another example, the one or more nodes maybe determined by the network device from all of nodes associated with the network device. According to one embodiment of the present disclosure, the method 400 further comprises the step of selecting one or more nodes from the associated nodes to training the parameters for a dynamic power control model. For example, the network device may select the nodes based on type of a node, the number of stations (STAs) connected to a node, the transmission power window of the node and/or the receiving sensitivity window of the node.

For example, the network device may select the nodes which are APs for training the parameters of the dynamic power control model. Thus, the sever transmits third information indicating one or more parameters for a dynamic power control model to the AP nodes.

Alternatively, the initial values for the one or more parameters of the dynamic power control model may be predetermined and stored in the node. In this case, the step 405 may be omitted.

At 410, the network device may receive first information indicating the first optimized result of the one or more parameters of the dynamic power control model from each of one or more nodes associated with the network device, wherein the first optimized result of the one or more parameters of a node associated with the network devices obtained based on environment information of the node. And at 415, the network device may update the one or more parameters based on the first optimized results of the one or more parameters from each of one or more nodes. For example, the network device may update the one or more parameters by performing weighted average to the first optimized results of the one or more parameters from the one of more nodes. For example, the network device may perform the algorithm of FederatedAveraging (FedAvg) to the first optimized results of the one or more nodes for each parameter, to obtain the update of the corresponding parameter.

At 420, the network device may transmit the second optimized result of the one or more parameters for the dynamic power control model to the one or more nodes. According to one embodiment of the present disclosure, the network device may repeat the procedure described in conjunction with FIG. 4, until the dynamic power control model for the wireless network is completed convergence. For example, the number of repetition reaches a predetermined threshold or optimization of the dynamic power control model with the second optimized result of the one or more parameters satisfies a predetermined condition.

According to one embodiment of the present disclosure, the node may initial the optimizing of the dynamic power control model. For example, the method 300 further comprises the step of sending the request to the network device to optimize the dynamic power control model. The method 400 further comprises the step of receiving the request from the node and determining to perform the steps 405-420 in FIG. 4. According to another embodiment of the present disclosure, the network device may initial the optimizing of the dynamic power control model, and perform the steps 405-420 in FIG. 4.

Figure 5:
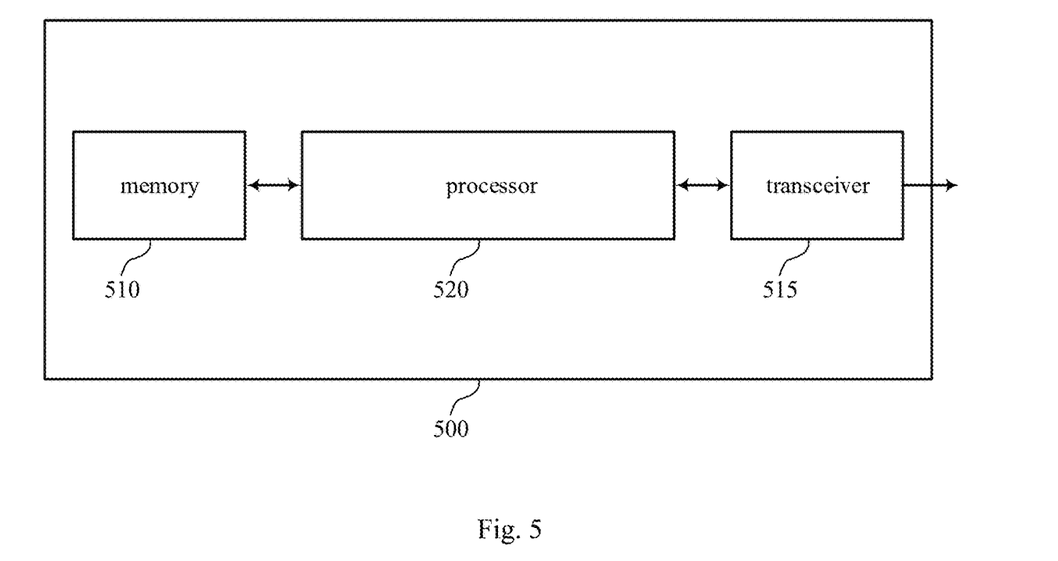
FIG. 5 is a schematic block diagram of a node according to one embodiment of the present disclosure.

FIG. 5 shows a block diagram 500 of a node in accordance with one or more aspects of the present disclosure. The node 500 may include a memory 510, a transceiver 515, and a processor 520. Each of these components may be in communication with one another (e.g., via one or more buses). The processor 520 is communicatively coupled with the memory and configured to perform steps in method 300 discussed above.

Examples of the processor 520 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 520 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the memory 510.

The memory 510 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software (e.g. code and/or instructions) that may be accessed and read by a computer. The memory 510 may reside in the processor 520, external to the processor 520, or distributed across multiple entities including the processor 520. Memory 510 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

The transceiver 515 may communicate bi-directionally, via one or more antennas, wired, or wireless links as described herein. For example, the transceiver 515 may represent a wireless transceiver and may communicate bi-directionally with another wireless transceiver. The transceiver 515 may also include a modem to modulate the packets and provide the modulated packets to the antennas for transmission, and to demodulate packets received from the antennas.

The transceiver 515 may receive third information indicating initial values of one or more parameters for a dynamic power control model from a network device associated with the node. Alternatively, the initial values for the one or more parameters of the dynamic power control model may be predetermined and stored in the node. In this case, the The transceiver 515 may not need to receive the third information.

The processor 520 may determine a first optimized result to the initial values of one or more parameters for minimizing a loss function, by using environment information of the node.

In one embodiment of the present disclosure, the processor 520 may determine the first optimized result of the one or more parameters for the dynamic power control model by a double deep Q-learning network (DDQN) value-based reinforcement learning method. For example, the weight vector of the DDQN value-based reinforcement learning method is a function of key performance indicators (KPIs) determined by the node. For another example, the processor 520 may select a KPI calculation function according to its own traffic requirements (such as downloading, gaming, etc.). The KPIs maybe related to at least one of latency, throughput, power consumption, CQI, SNR/SINR, interference intensity of the node. Moreover, the KPIs may at least include a transmission power and a receiving sensitivity of the node. The KPI calculation functions for different nodes may be different. For example, the different types of nodes may use different KPI calculation functions. Thus, the node may calculate the first optimized result to the initial values for the one or more parameters of the dynamic power control model, by using its own environment information via the DDQN value-based reinforcement learning method with the KPI calculation function of the node.

According to another embodiment of the present disclosure, the processor 520 may determine the first optimized result of the one or more parameters for the dynamic power control model by a policy-gradient-based learning method. For example, the policy-gradient-based learning method maybe an actor-critic method with an actor network and a critic network. The actor network maybe configured to generate a strategy of determining a transmission power and a receiving sensitivity of the node, and the critic network may be configured to evaluate the strategy with a function of key performance indicators (KPIs) determined by the node. As mentioned above, the KPIs maybe related to at least one of latency, throughput, power consumption, CQI, SNR/SINR, interference intensity of the node. Moreover, the KPIs may at least include a transmission power and a receiving sensitivity of the node. The KPI calculation functions for different nodes may be different. Thus, the node may calculate the first optimized result to the initial values for the one or more parameters of the dynamic power control model, by using its own environment information via the policy-gradient-based learning method with the KPI calculation function of the node.

Moreover, the transceiver 515 may transmit first information indicating a first optimized result of the one or more parameters to the network device. For example, the first information indicates a first optimized result of each parameter in the one or more parameters. For another example, the first information indicates a difference between a first optimized result of each parameter in the one or more parameters and a corresponding parameter send by the network device.

For example, the one or more parameters are related to one or more of the following parameters: a transmission power, a receiving sensitivity, and a window related to the transmission power and/or the receiving sensitivity. Moreover, the processor 520 may adjust the transmission power and/or the receiving sensitivity of the node according to the second optimized result of the one or more parameters determined by the network device.

According to one embodiment of the present disclosure, the node may repeat the procedure described, until the dynamic power control model for the wireless network is completed convergence. For example, the number of repetition reaches a predetermined threshold or optimization of the dynamic power control model with the second optimized result of the one or more parameters satisfies a predetermined condition. Moreover, when the dynamic power control model for the wireless network is completed convergence, the processor 520 may further adjust the transmission power and/or the receiving sensitivity of the node according to the second optimized result of the one or more parameters determined by the network device.

Figure 6:
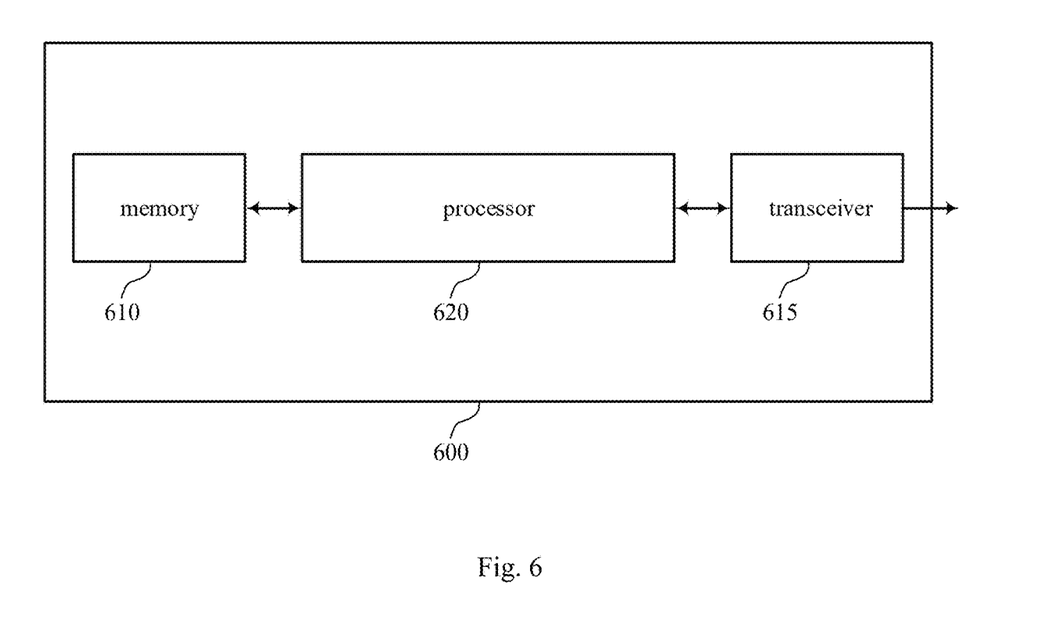
FIG. 6 is a schematic block diagram of a network device according to one embodiment of the present disclosure.

FIG. 6 shows a block diagram 600 of a network device in accordance with one or more aspects of the present disclosure. The network device 600 may include a memory 610, a transceiver 615, and a processor 620. Each of these components may be in communication with one another (e.g., via one or more buses). The processor 620 is communicatively coupled with the memory and configured to perform steps in method 400 discussed above.

Examples of the processor 620 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 620 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the memory 610.

The memory 610 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software (e.g. code and/or instructions) that may be accessed and read by a computer. The memory 610 may reside in the processor 620, external to the processor 620, or distributed across multiple entities including the processor 620. Memory 610 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

The transceiver 615 may communicate bi-directionally, via one or more antennas, wired, or wireless links as described herein. For example, the transceiver 615 may represent a wireless transceiver and may communicate bi-directionally with another wireless transceiver. The transceiver 615 may also include a modem to modulate the packets and provide the modulated packets to the antennas for transmission, and to demodulate packets received from the antennas.

The transceiver 615 may transmit third information indicating one or more parameters for a dynamic power control model to one or more nodes associated with the network device. For example, the one or more parameters are related to one or more of the following parameters: a transmission power, a receiving sensitivity, and a window related to the transmission power and/or the receiving sensitivity.

For another example, the one or more nodes maybe determined by the network device from all of nodes associated with the network device. According to one embodiment of the present disclosure, the processor 620 may select one or more nodes from the associated nodes to training the parameters for a dynamic power control model. For example, the network device may select the nodes based on type of a node, the number of stations (STAs) connected to a node, the transmission power window of the node and/or the receiving sensitivity window of the node.

For example, the processor 620 may select the nodes which are APs for training the parameters of the dynamic power control model. Thus, the sever transmits third information indicating one or more parameters for a dynamic power control model to the AP nodes. Alternatively, the initial values for the one or more parameters of the dynamic power control model may be predetermined and stored in the node. In this case, the transceiver 615 may not need to transmit the third information.

The transceiver 615 may receive first information indicating the first optimized result of the one or more parameters from each of one or more nodes associated with the network device, wherein the first optimized result of the one or more parameters of a node associated with the network devices obtained based on environment information of the node. And then, the processor 620 may update the one or more parameters based on the first optimized results of the one or more parameters from each of one or more nodes. For example, the processor 620 may update the one or more parameters by performing weighted average to the first optimized results of the one or more parameters from the one of more nodes. For example, the network device may perform the algorithm of FederatedAveraging (FedAvg) to the first optimized results of the one or more nodes for each parameter, to obtain the update of the corresponding parameter.

The transceiver 615 may transmit the second optimized result of the one or more parameters for the dynamic power control model to the one or more nodes. According to one embodiment of the present disclosure, the network device may repeat the procedure described in conjunction with FIG. 4, until the dynamic power control model for the wireless network is completed convergence. For example, the number of repetition reaches a predetermined threshold or optimization of the dynamic power control model with the second optimized result of the one or more parameters satisfies a predetermined condition.

According to one embodiment of the present disclosure, the node may initial the optimizing of the dynamic power control model. For example, the transceiver 515 of the node may send the request to the network device to optimize the dynamic power control model. The transceiver 615 may receive the request from the node and determining to perform the steps 405-420 in FIG. 4. According to another embodiment of the present disclosure, the network device may initial the optimizing of the dynamic power control model, and perform the steps 405-420 in FIG. 4.

Figure 7:
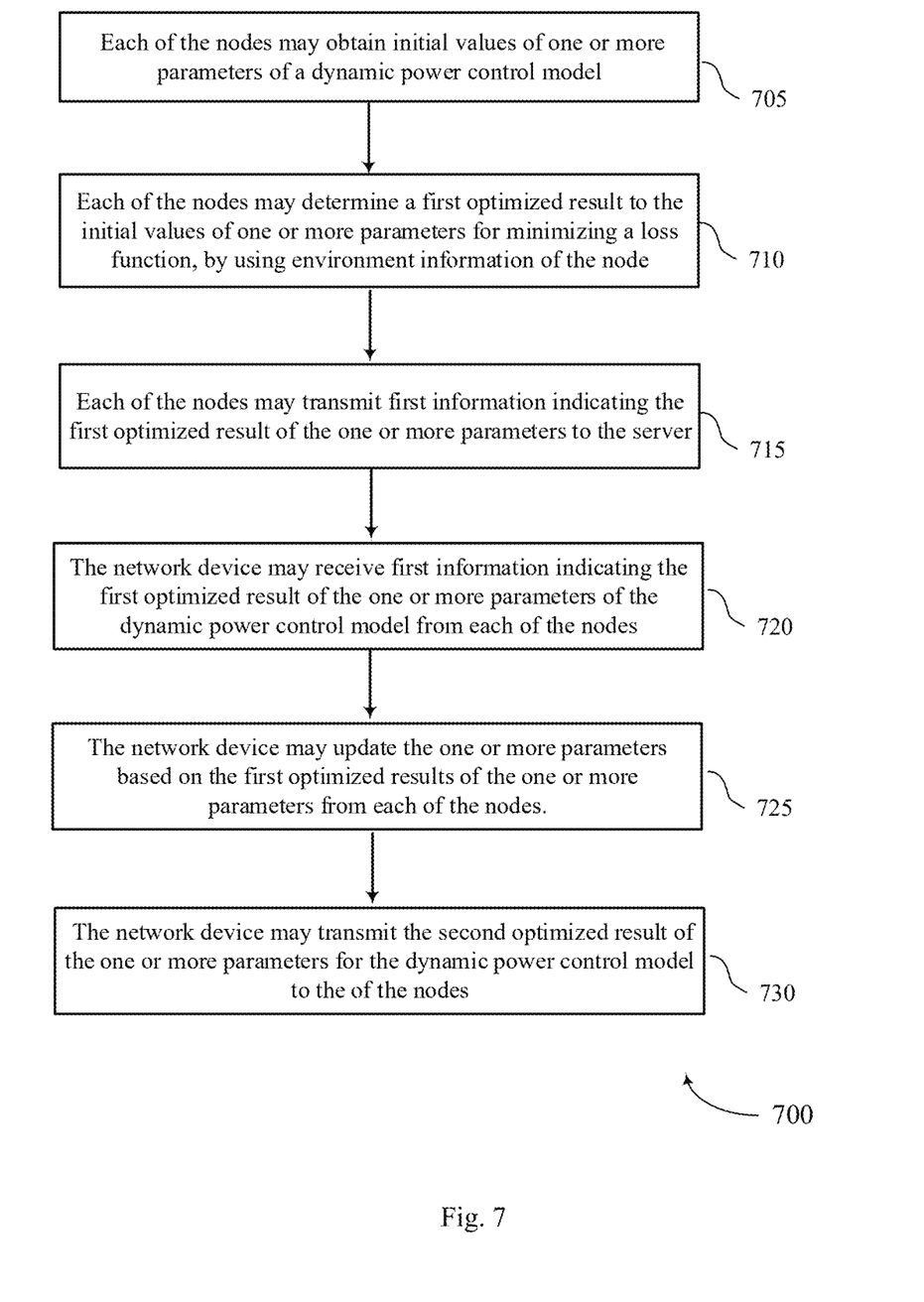
FIG. 7 is a flowchart illustrating a method 700 for wireless communication in a wireless network in accordance with one or more aspects of the present disclosure.

FIG. 7 shows a flowchart illustrating a method 700 for wireless communication in a wireless network in accordance with one or more aspects of the present disclosure. The operations of method 700 may be implemented by the wireless network includes the network device and the node(s) as described herein. For example, the operations of method 700 may be performed by the server and its associated nodes as described with reference to FIGS. 1 through 2.

As mentioned above, the network device may select one or more nodes from the associated nodes to training the parameters for a dynamic power control model. At 705, each of the selected node may obtain initial values of one or more parameters of a dynamic power control model. For example, method 700 may further include the step of transmitting third information indicating initial values of one or more parameters for a dynamic power control model by the network device to one or more nodes associated with the network device. For another example, the node may obtain the predetermined initial values of one or more parameters of a dynamic power control model at 705.

At 710, each of the selected node may determine a first optimized result to the initial values of one or more parameters for minimizing a loss function by using environment information of the node. Moreover, at 715, the node may transmit first information indicating a first optimized result of the one or more parameters to the network device.

At 720, the network device may receive first information indicating the first optimized result of the one or more parameters of the dynamic power control model from each of the selected nodes associated with the network device, wherein the first optimized result of the one or more parameters of a node associated with the network devices obtained based on environment information of the node. And at 725, the network device may update the one or more parameters based on the first optimized results of the one or more parameters from each of one or more nodes. For example, the network device may update the one or more parameters by performing weighted average to the first optimized results of the one or more parameters from the one of more nodes. For example, the network device may perform the algorithm of FederatedAveraging (FedAvg) to the first optimized results of the one or more nodes for each parameter, to obtain the update of the corresponding parameter.

At 730, the network device may transmit the second optimized result of the one or more parameters for the dynamic power control model to the one or more nodes. According to one embodiment of the present disclosure, the network device and node may repeat the procedure described in conjunction with FIG. 7, until the dynamic power control model for the wireless network is completed convergence.

In addition, according to another embodiment of the present disclosure, a computer program product for controlling the bandwidth of a channel including a plurality of subchannels is disclosed. As an example, the computer program product comprises a non-transitory computer readable storage medium having program instructions embodied therewith, and the program instructions are executable by a processor. When executed, the program instructions cause the processor to perform one or more of the procedures above described, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

An expression such as "according to", "based on", "depend on", and so on as used in the disclosure does not mean "according only to", "based only on", or "dependent only on", unless it is explicitly otherwise stated. In other words, such expression generally means "according at least to", "based at least on", or "depend at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure may include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

It should be noted that the above description is only some embodiments of the present disclosure and an illustration of the applied technical principles. It should be understood by those skilled in the art that the present disclosure scope involved in the present disclosure is not limited to the technical solutions resulting from specific combinations of the above technical features, but also encompasses other technical solutions resulting from any combination of the above technical features or their equivalents without departing from the above disclosed concept, for example, the technical solutions formed by replacing between the above features and the technical features with similar functions disclosed in the present disclosure (but not limited hereto).

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for wireless communication at a node in a wireless network comprising:
   obtaining initial values of one or more parameters of a dynamic power control model;
   determining a first optimized result to the initial values of one or more parameters for minimizing a loss function, by using environment information of the node;
   transmitting first information indicating the first optimized result of the one or more parameters to a network device;
   receiving second information indicating a second optimized result of the one or more parameters for the dynamic power control model from the network device, wherein the second optimized result of the one or more parameters are determined by the network device based on the first information; and
   adjusting the transmission power and/or the receiving sensitivity of the node according to the second optimized result of the one or more parameters determined by the network device.

2. The method of claim 1, wherein determining a first optimized result to the initial values of one or more parameters for minimizing a loss function comprising:
   determining the first optimized result of one or more parameters for minimizing a loss function by a double deep Q-learning network (DDQN) value-based reinforcement learning method.

3. The method of claim 2, wherein
   a weight vector of the DDQN value-based reinforcement learning method is related to the one or more parameters.

4. The method of claim 3, wherein
   the weight vector of the DDQN value-based reinforcement learning method is a function of key performance indicators (KPIs) determined by the node.

5. The method of claim 1, wherein determining a first optimized result to the initial values of one or more parameters for minimizing a loss function comprising:
   determining the first optimized result of one or more parameters for minimizing a loss function by a policy-gradient-based learning method.

6. The method of claim 5, wherein
   the policy-gradient-based learning method is an actor-critic method with an actor network and a critic network, wherein
   the actor network is configured to generate a strategy of determining a transmission power and a receiving sensitivity of the node, the critic network is configured to evaluate the strategy with a function of key performance indicators (KPIs) determined by the node.

7. The method of claim 1, wherein the one or more parameters are related to one or more of the following parameters:
a transmission power,
a receiving sensitivity, and
a window related to the transmission power and/or the receiving sensitivity.

8. The method of claim 1, wherein
the first information includes the first optimized result of each parameter in the one or more parameters, or
the first information includes a difference between a first optimized result of each parameter in the one or more parameters and a corresponding parameter send by the network device.

9. The method of claim 1, wherein determining a first optimized result to the initial values of one or more parameters for minimizing a loss function, by using environment information of the node comprising:
calculating the first optimized result to the initial values of one or more parameters for minimizing a loss function, by using the environment information of the node.

10. A method for wireless communication at a network device in a wireless network, comprising following steps:
receiving first information indicating the first optimized result of the one or more parameters of a dynamic power control model from each of one or more nodes associated with the network device, wherein the first optimized result of the one or more parameters of a node is determined based on environment information of the node;
determining a second optimized result of the one or more parameters based on the first optimized result of the one or more parameters from each of one or more nodes; and
transmitting second information indicating the second optimized result of the one or more parameters for the dynamic power control model to the one or more nodes.

11. The method of claim 10, further comprises:
repeat the steps in claim 10 until the number of repetition reaches a predetermined threshold or optimization of the dynamic power control model with the second optimized result of the one or more parameters satisfies a predetermined condition.

12. The method of claim 10, wherein the method further comprises:
selecting one or more nodes from all of nodes associated with the network device.

13. The method of claim 12, wherein selecting one or more nodes from all of nodes associated with the network device is based on one or more of the following perimeters:
type of a node;
number of stations (STAs) connected to a node;
a range of a transmission power window; and
a range of a receiving sensitivity window.

14. The method of claim 10, determining a second optimized result of the one or more parameters based on the first optimized result of the one or more parameters from each of one or more nodes comprises:
performing weighted average to the first optimized result of the one or more parameters from the one or more nodes to obtain the second optimized result of the one or more parameters.

15. A node in a wireless network comprising:
at least one memory;
at least one transceiver; and
at least one processor communicatively coupled to the memory and the at least one transceiver, the at least one processor configured to:
obtain initial values of one or more parameters of a dynamic power control model;
determine a first optimized result to the initial values of one or more parameters for minimizing a loss function, by using environment information of the node;
transmit, via the at least one transceiver, first information indicating the first optimized result of the one or more parameters to a network device; and
receive, via the at least one transceiver, second information indicating a second optimized result of the one or more parameters for the dynamic power control model from the network device, wherein the second optimized result of the one or more parameters are determined by the network device based on the first information; and
adjusting the transmission power and/or the receiving sensitivity of the node according to the second optimized result of the one or more parameters determined by the network device.

16. The node of claim 15, wherein the at least one processor is configured to:
determining the first optimized result of the one or more parameters for the dynamic power control model by a double deep Q-learning network (DDQN) value-based reinforcement learning method.

17. The node of claim 16, wherein
a weight vector of the DDQN value-based reinforcement learning method is related to the one or more parameters.

18. The node of claim 17, wherein
the weight vector of the DDQN value-based reinforcement learning method is a function of key performance indicators (KPIs) determined by the node.

19. The node of claim 15, wherein the at least one processor is configured to:
determining the first optimized result of the one or more parameters for the dynamic power control model by a policy-gradient-based learning method.

* * * * *